US012391060B1

(12) United States Patent
Cano et al.

(10) Patent No.: US 12,391,060 B1
(45) Date of Patent: Aug. 19, 2025

(54) APPARATUS FOR ADJUSTABLY RETAINING AN EXPENDABLE MEDIUM FOR WRITING AND/OR DRAWING

(71) Applicant: CRAYOLA LLC, Easton, PA (US)

(72) Inventors: Cynthia Cano, Allentown, PA (US); Douglas A. Brand, Easton, PA (US); Christopher P. Orem, Easton, PA (US); Thomas R. Rau, Easton, PA (US)

(73) Assignee: Crayola LLC, Easton, PA (US)

(*) Notice: Subject to any disclaimer, the term of this patent is extended or adjusted under 35 U.S.C. 154(b) by 0 days.

(21) Appl. No.: 18/204,429

(22) Filed: Jun. 1, 2023

Related U.S. Application Data

(60) Provisional application No. 63/409,531, filed on Sep. 23, 2022, provisional application No. 63/347,738, filed on Jun. 1, 2022.

(51) Int. Cl.
*B43K 21/08* (2006.01)
*B43K 21/00* (2006.01)

(52) U.S. Cl.
CPC ............ *B43K 21/08* (2013.01); *B43K 21/006* (2013.01)

(58) Field of Classification Search
CPC .............................. B43K 21/08; B43K 21/006
USPC ......................................................... 401/116
See application file for complete search history.

(56) References Cited

U.S. PATENT DOCUMENTS

| | | | |
|---|---|---|---|
| 7,329,062 | B2 | 2/2008 | Brand et al. |
| 2007/0274765 | A1 | 11/2007 | Brand et al. |

FOREIGN PATENT DOCUMENTS

| | | | |
|---|---|---|---|
| KR | 200330913 | Y1 * | 10/2003 |
| KR | 2016000432 | U * | 2/2016 |

OTHER PUBLICATIONS

Website Catalog for Crayola, "Twistables", downloaded from the internet at https://shop.crayola.com/search?q=twistables on Nov. 8, 2024 (6 pgs).

Crayola Digital Product Catalog, "Twistables Colored Pencils", downloaded from the internet at https://app.salsify.com/catalogs/9d514fc0-b4a3-47b0-863b-122ff865491c/products/6874080013 on Nov. 8, 2024 (1 pg).

* cited by examiner

*Primary Examiner* — Jennifer C Chiang
(74) *Attorney, Agent, or Firm* — Stinson LLP

(57) ABSTRACT

An apparatus for adjustably retaining an expendable medium for writing or drawing such as for a crayon core, a wax or oil based pencil (colored pencil) core, a chalk core or a pastel core includes a tubular barrel, at least one elongated arcuate body element, and a follower in abutting engagement with a portion of the body. The follower has a helical surface feature corresponding with spaced surface features of the body. The follower is configured to receive a non-writing end of an expendable core. The apparatus is configured such that the outer barrel of the apparatus can be made from a paper based material such as paperboard or other fibrous material that is more eco-friendly than other material such as plastics.

20 Claims, 20 Drawing Sheets

APPARATUS FOR ADJUSTABLY RETAINING AN EXPENDABLE MEDIUM FOR WRITING AND/OR DRAWING

CROSS-REFERENCE TO RELATED APPLICATIONS

This application claims priority to U.S. Provisional Patent Application No. 63/347,738, filed on Jun. 1, 2022, and U.S. Provisional Patent Application No. 63/409,531, filed on Sep. 23, 2022, each of which is incorporated herein by reference in its entirety.

BACKGROUND OF THE INVENTION

1. Field of the Invention

Aspects of the technology described herein relate to writing utensils. More specifically, aspects of the technology described herein relate to a writing utensil with an expendable core which may be extended or retracted by rotating a portion of the utensil.

2. Description of Related Art

Numerous writing utensils are capable of adjustably retaining an expendable medium, such as a crayon, a pencil, chalk, or a pastel. Frequently, these writing utensils will include a twist-to-drive mechanism that allows a user to extend or retract the expendable medium through an opening at a writing end of the utensil. These adjustable writing utensils frequently have a rigid, unitary body and a plug that is configured to rotate relative to the body to drive the expendable medium forward and backward. Generally, the plug is positioned on a non-writing end of the utensil opposite the writing end. In most cases, these utensils are designed for one-time use. Accordingly, these utensils are predominantly made from plastic components to minimize production costs. Further, since they are designed to be disposed of after a single use, these products are generally not designed to be disassembled and/or reassembled for recycling and/or reuse.

BRIEF SUMMARY OF THE INVENTION

The present invention is directed to an apparatus for adjustably retaining an expendable medium for writing or drawing such as for a crayon core, a wax or oil based pencil (colored pencil) core, a chalk core or a pastel core. The apparatus is configured such that an outer barrel of the apparatus can be made from a paper based material such as paperboard or other fibrous material that is more eco-friendly than other material such as plastics. The apparatus includes a tubular barrel having an outer barrel surface and an inner barrel surface. The tubular barrel may be formed of a paper-based material such as paper board or another fibrous material. At least one elongated arcuate body having an outer body surface and an inner body surface is positioned within the barrel with the outer body surface positioned in abutting engagement with the inner barrel surface. The inner body surface includes spaced surface features (indentations or protrusions) that define a spiral path along the length of the body. A follower having a helical surface feature (indentation or protrusion) corresponding with the spaced surface features of the body is positioned in abutting engagement with at least a portion of the inner body surface. The follower includes an aperture configured to receive a non-writing end of an expendable medium or core. The at least elongated arcuate body may have a cross-sectional profile that is less than 180°. The barrel, the at least one elongated arcuate body and the follower may be connected mechanically without the use of adhesives.

In a first exemplary embodiment, a spacer is immovably affixed to an end of the tubular barrel and a rotatable collet is rotatably affixed to the spacer. The collet includes a non-circular shaped passageway corresponding in shape to the expendable core such that the core can freely slide through the passageway in the direction of the longitudinal axis of the passageway, but not rotate within the passageway relative to the collet.

In some embodiments, the outer body surface is glued to the inner barrel surface. In some embodiments, the spaced surface features of the body include spaced indentations and the helical surface feature of the follower includes a helical ridge. The elongated body may also have a closed end configured to close the non-writing end of the barrel.

In some embodiments, the non-circular shaped passageway of the collet has a polygonal shaped cross-section such as a hexagonal shaped cross-section. In some embodiments, the non-circular shaped passageway of the collet is configured to receive and rotate in tandem with an expendable core with a polygonal cross-section, which may include a hexagonal shaped cross-section.

In use, the expendable core of the first exemplary embodiment is positioned within the body in the barrel and secured at the non-writing end within the aperture in the follower such that the core does not move relative to the follower. The writing end of the core extends through the spacer and through the non-circular shaped passageway in the collet such that the core can slide through the collet along the longitudinal axis of the passageway but not rotate relative to the collet. Rotation of the collet thereby causes rotation of the core which thereby causes rotation of the follower. The surface features on the body and the follower cause the follower to move in the body and barrel along the longitudinal axis of the apparatus upon rotation of the follower. Because the core is immovably affixed to the follower this causes the writing end of the core to be moved to extend further outward from the writing end of the apparatus or to be retracted inward toward the non-writing end. In this manner, a user can rotate the collet in order to move the writing end of the core outward as the core material is depleted.

In a second exemplary embodiment, the apparatus includes a plurality of body members, a tubular barrel, an elongated cradle, a follower and a core. The apparatus comprises a tubular barrel having an outer barrel surface and an inner barrel surface. The tubular barrel may be formed of a paper-based material such as paper board or another fibrous material. Each body member includes a head portion, a collar portion, a guide portion having an inner guide surface, and a connection portion. The inner guide surface includes spaced surface features. The elongated cradle has an outer cradle surface, an inner cradle surface and cradle edges is configured to engage abuttingly with the inner guide surface of each one of the plurality of body members. A plug is coupled to the elongated cradle. In some embodiments, the plug may be integrally formed with the elongated cradle. The plug is configured to engage the connection portion of each of the plurality of body members to secure the plug and the plurality of body members together while permitting the plug and follower to rotate about a longitudinal axis of the apparatus relative to the plurality of body members. The follower is positioned within the cradle in abutting engagement with the inner cradle surface. The follower has a helical surface feature corresponding with the spaced surface features of the inner guide surfaces of the plurality of body members such that the spaced surface features define a spiral path for the follower along the length of the apparatus. In this embodiment, the follower has two contact surfaces corresponding with the cradle edges such that the follower rotates with the cradle when a respective one of the contact surfaces abuts a corresponding one of the cradle edges and torque is applied.

In use, the expendable core of the second exemplary embodiment is positioned between the plurality of body members, and each body member is positioned within the barrel. The core is secured at the non-writing end within the aperture in the follower such that the core does not move relative to the follower. The writing end of the core extends through an aperture at the writing end of the apparatus such that the core can slide through the aperture along the longitudinal axis of the apparatus. When torque is applied to the plug (or the cradle), one of the cradle edges contacts a corresponding contact surface on the follower, thereby causing the follower to rotate. As the follower is thus rotated, the surface features on the body members and the follower cause the follower to travel within the body along the longitudinal axis of the apparatus. Because the core is immovably affixed to the follower, this action causes the writing end of the core to rotate and move in tandem, either extending farther outward from the writing end of the apparatus, or retracting inward toward the non-writing end. In this manner, a user can rotate the plug in order to move the writing end of the core outward as the core material is depleted.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
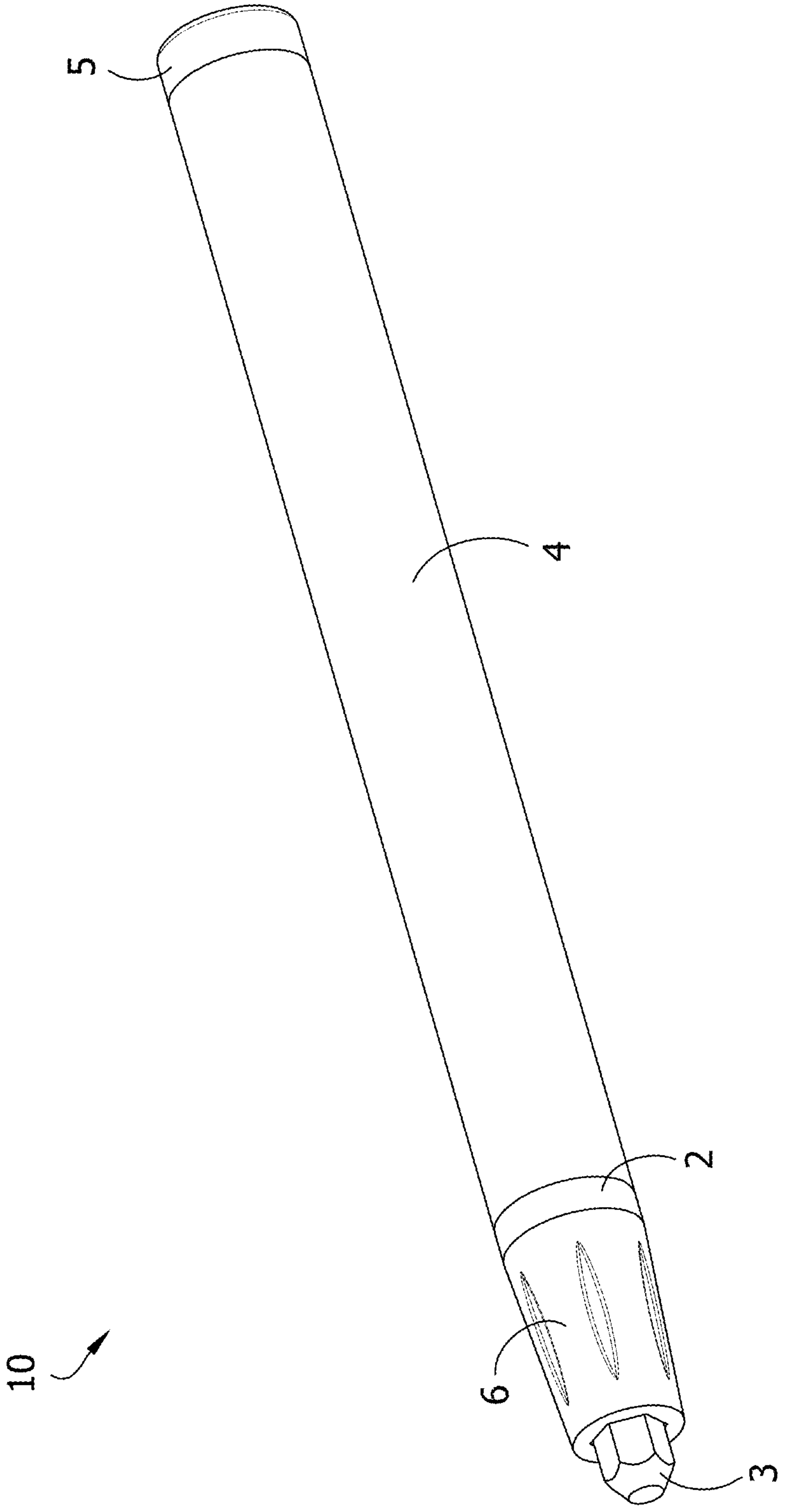
FIG. 1 is a perspective view of an apparatus in accordance with a first exemplary embodiment of the present invention showing a crayon core adjustably retained within the apparatus.

Aspects of the technology described herein will become more apparent with reference to the figures provided herein. An apparatus 10 for adjustably retaining an expendable writing and/or drawing medium or core (such as a crayon core) in accordance with a first exemplary embodiment of the present invention described and claimed herein is denoted generally in FIGS. 1-2, 4 and 11-12 by numeral 10. As shown in FIG. 1, apparatus 10 can receive a writing medium or core such as the depicted crayon core 3 and is adjustable such that a user can drive the core 3 either forward or backward along the longitudinal axis of apparatus 10. When core 3 is received by apparatus 10 and positioned properly, it will be appreciated that the apparatus 10 can be used for writing or drawing in a manner similar to how a user would use a traditional writing utensil. However, as the core 3 becomes worn down from use, the user can periodically adjust the apparatus 10 so that the core 3 protrudes from the body of the apparatus 10 at a generally constant distance even as the end of the core 3 is worn down from use. The apparatus 10 of the present invention may use a paper barrel 4 on its exterior, in contrast to other adjustable systems that have a body made primarily of plastic components, thereby substantially reducing the amount of plastic in the apparatus 10. During use, the user primarily holds the apparatus 10 by gripping the paper barrel 4 and the collet 6, though it is contemplated that other surfaces along the body of apparatus 10 are suitable for gripping and handling. As will be described herein below, collet 6 is configured to be rotated by the user to facilitate the driving action to adjust the position of the core 3.

Referring now to FIGS. 1-4, apparatus 10 includes a paper barrel 4, a trough 5, a spacer 2, a collet 6, and a follower 1. An expendable core for writing and/or drawing such as a crayon core 3 is received by the apparatus 10. The exterior body of apparatus 10 is elongate and generally cylindrical, the body being defined by a closed-end 12 of the trough 5, the tubular shaped paper barrel 4, the spacer 2 and the collet 6. Portions of the inside wall of the paper barrel 4 are glued or otherwise affixed to portions of the trough 5 and the spacer 2 such that the paper barrel, trough and spacer are immovable relative to one another and are generally rigid. In contrast to these body elements, which do not move relative to one another, the collet 6 is rotatably attached to the spacer 2 in a manner that allows the collet 6 to rotate clockwise and counterclockwise relative to the central axis of apparatus 10. As will be explained in greater detail herein, the rotation of collet 6 is essential to the driving mechanism of the apparatus. The body is shaped and sized to be held and handled like a traditional writing and/or drawing utensil. It will be appreciated that the collet 6 tapers slightly inward toward the writing end of the apparatus, improving handling and gripping near the exposed portion of the core 3 that protrudes outward from the body. On the opposite end of the body, the end of the paper barrel 4 is closed by the closed end 12 of trough 5 to reduce the risk of accidental or deliberate disassembly of the apparatus 10 and/or interference with the driving mechanism housed within the body.

Figure 2:
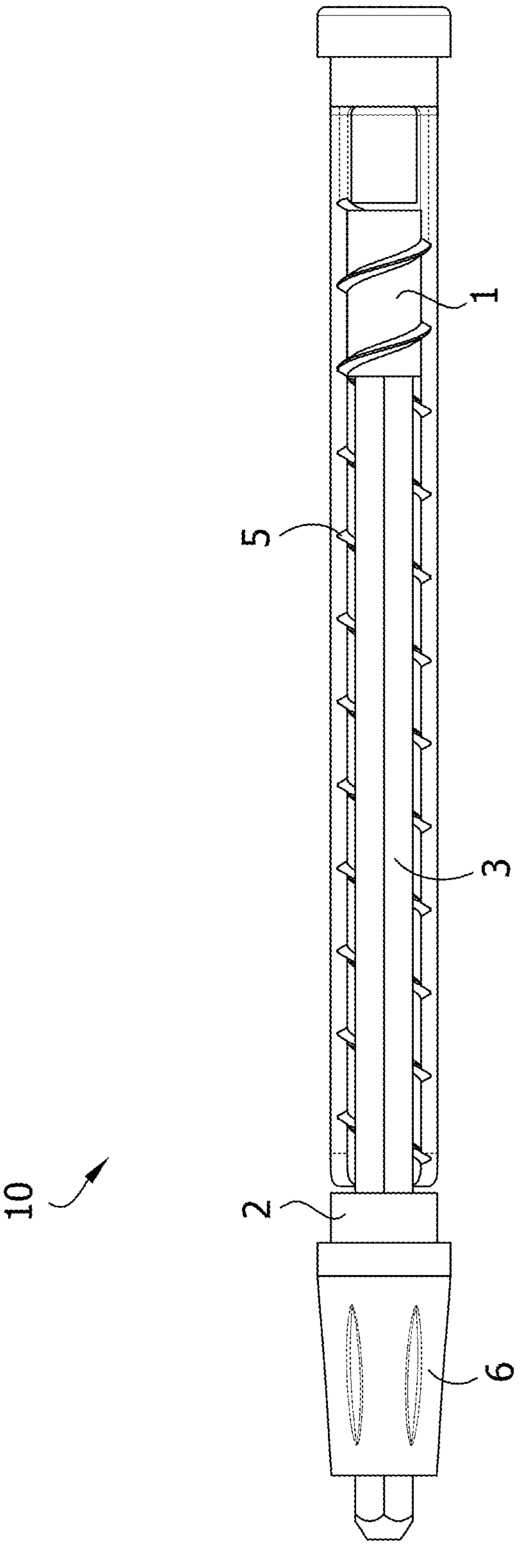
FIG. 2 is a side elevational view of the apparatus of FIG. 1 showing the crayon core in the apparatus with the paper barrel removed.
Figure 11:
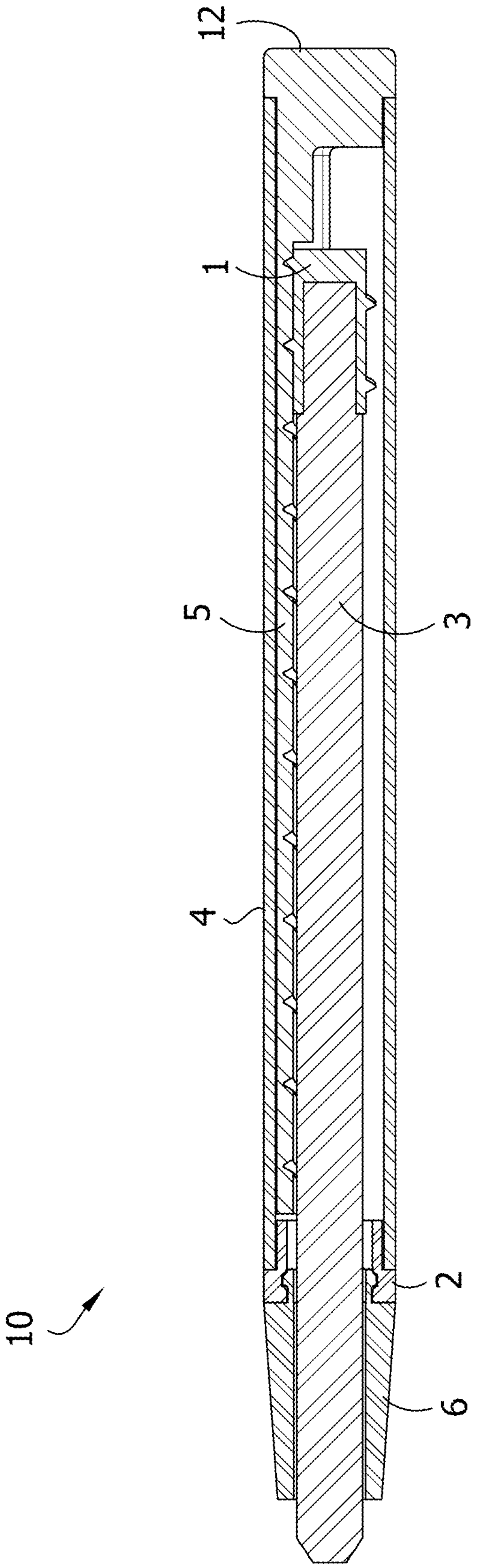
FIG. 11 is a cross-sectional side view of the apparatus of FIG. 1 taken through the line 11-11 of FIG. 2.
Figure 12:
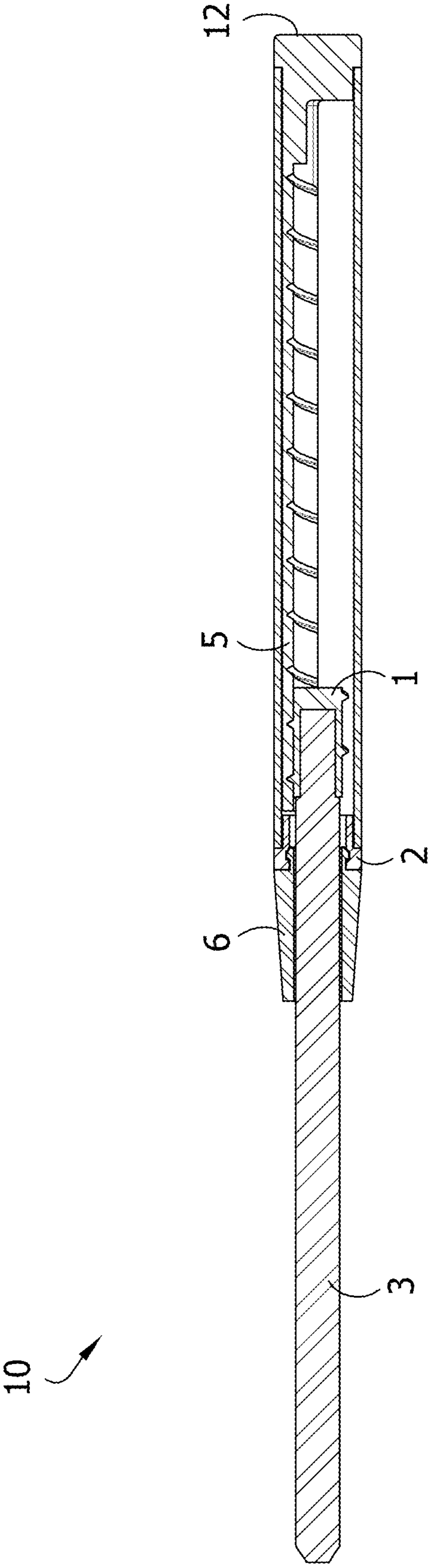
FIG. 12 is a cross-sectional side view thereof showing the crayon core in an extended position.

As best shown in FIGS. 3, 8 and 11-12, the driving mechanism of the apparatus is defined by a guiding portion 14 of the trough 5, the follower 1, the collet 6 and the spacer 2. The follower 1 is configured to securely receive a non-writing end 16 of the core 3 and to follow a spiral path defined by grooves 18 in the guiding portion of the trough 5. Due to the constraints in the movement of the follower 1, to which the core 3 is attached, the core 3 may only advance forward or backward along the longitudinal axis when the core 3 is rotated clockwise or counterclockwise relative to the longitudinal axis. It will be appreciated, then, that the collet 6 is configured to drive the rotation of the core 3 and, by extension, the rotation of the follower 1 to allow for the longitudinal advancement of the core. In the present embodiment, this is accomplished by forming the core 3 as a hexagonal extrusion (best shown in FIG. 5) and providing a corresponding hexagonal passage 20 in the collet 6 (best shown in FIG. 7) that envelops the core 3 in two dimensions while generally not constraining movement in the third direction along the longitudinal axis of the body, as can be seen in FIGS. 2 and 11-12. It will be appreciated that the inner surface of hexagonal passage 20 should have a low frictional coefficient to facilitate movement of the core 3 therethrough. While the spacer 2 does not actively contribute to the driving action, the spacer 2 isolates the collet 6 from both the paper barrel 4 and the trough 5 and provides a durable, low-friction region of engagement for the collet 6 so the collet 6 can rotate relative to the rest of the body without catching on and/or damaging other portions of the apparatus 10. In the present embodiment, the collet 6 and spacer 2 are snap fit together, though it is contemplated that these components can be otherwise secured together without departing from the scope of the invention. It is contemplated that in alternative embodiments, another collet may have a differently shaped passage that can engage the core in a functionally similar manner.

Figure 8:
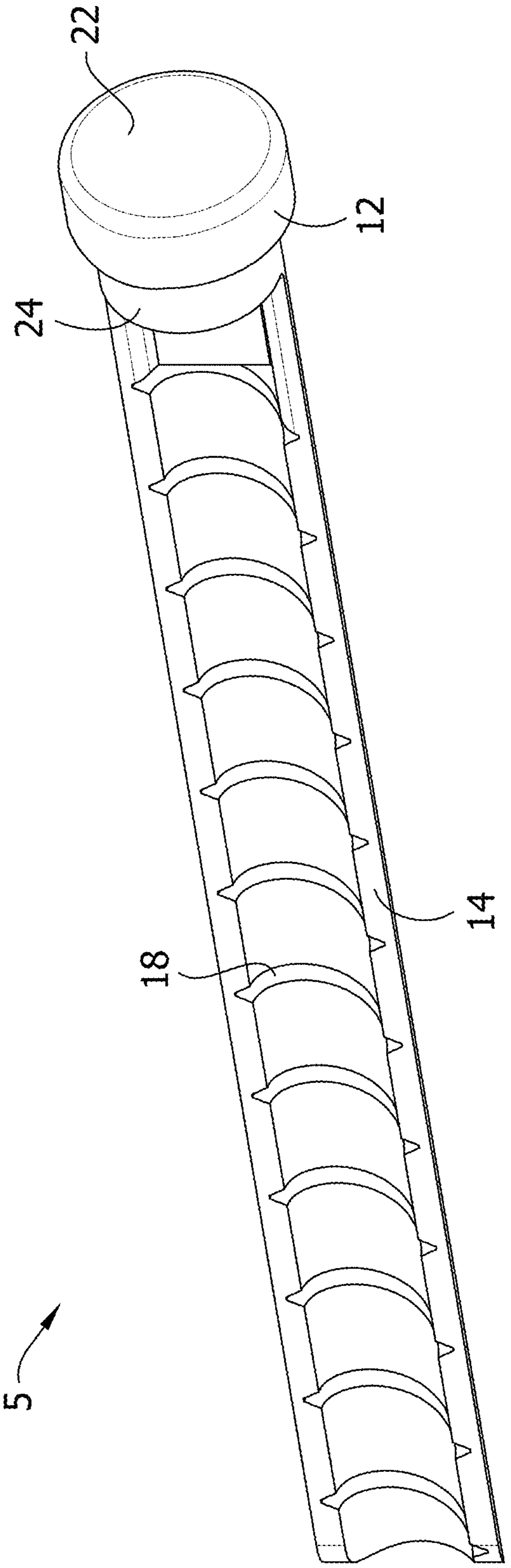
FIG. 8 is an enlarged perspective view of the trough component of the apparatus of FIG. 1.
Figure 9:
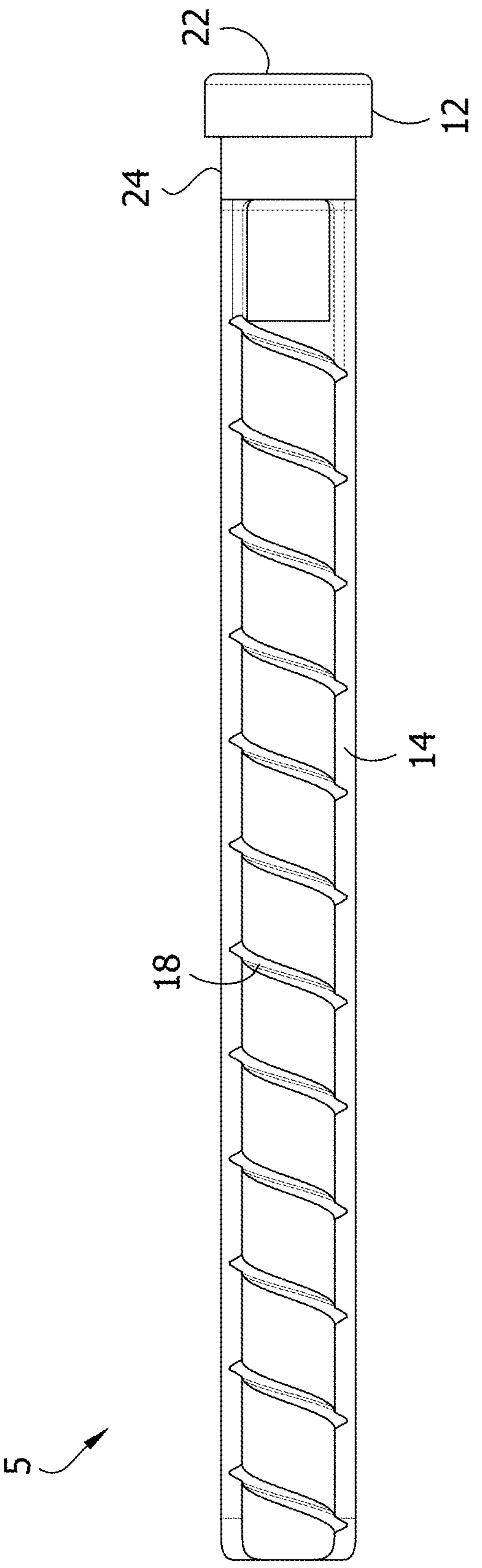
FIG. 9 is a top plan view of the trough component of FIG. 8.

As shown in FIGS. 8 and 9, the trough 5 is defined by a closed end 12 and an elongated guide portion 14 extending forward of end 12. Closed-end 12 has a round cap 22 and a short cylindrical neck 24 extending forward of the cap 22. The neck is configured to be received by the end of the paper barrel 4 such that the sides of the cap are flush with the barrel 4. The guide portion 14 has a hollowed, generally semicircular profile, which allows the guide portion to fit between a portion of the interior of paper barrel 4 on one side, and the follower 1 and core 3 on the other side. Referring again to FIGS. 8 and 9, the interior wall of the guide portion includes a series of spaced grooves 18. These grooves 18 are dimensioned to engage with the spiral or helical ridge 26 of the follower 1. It will be appreciated that the pitch of grooves 18 in the trough 5 correspond with the pitch of ridge 26 in the follower 1, and this, in turn, allows the follower 1 to travel forward or backward on the spiral path defined by the grooves 18 of the trough 5 when the follower 1 is rotated either counterclockwise or clockwise, respectively. In addition to its role in the driving mechanism, the guide portion 14 of the trough 5 provides structural reinforcement to the body. When the apparatus 10 is assembled, the guide portion extends the entire distance between the closed-end 12 of the trough 5 and the spacer 2, and the guide portion is adhered to a portion of the interior wall of the paper barrel 4. As a consequence, it will be appreciated that loads received by the body will be distributed through both the trough 5 and the paper barrel 4. In the present embodiment, it is contemplated that the trough 5 is made of polypropylene or another semi-rigid to rigid, low-friction polymer.

Figure 3:
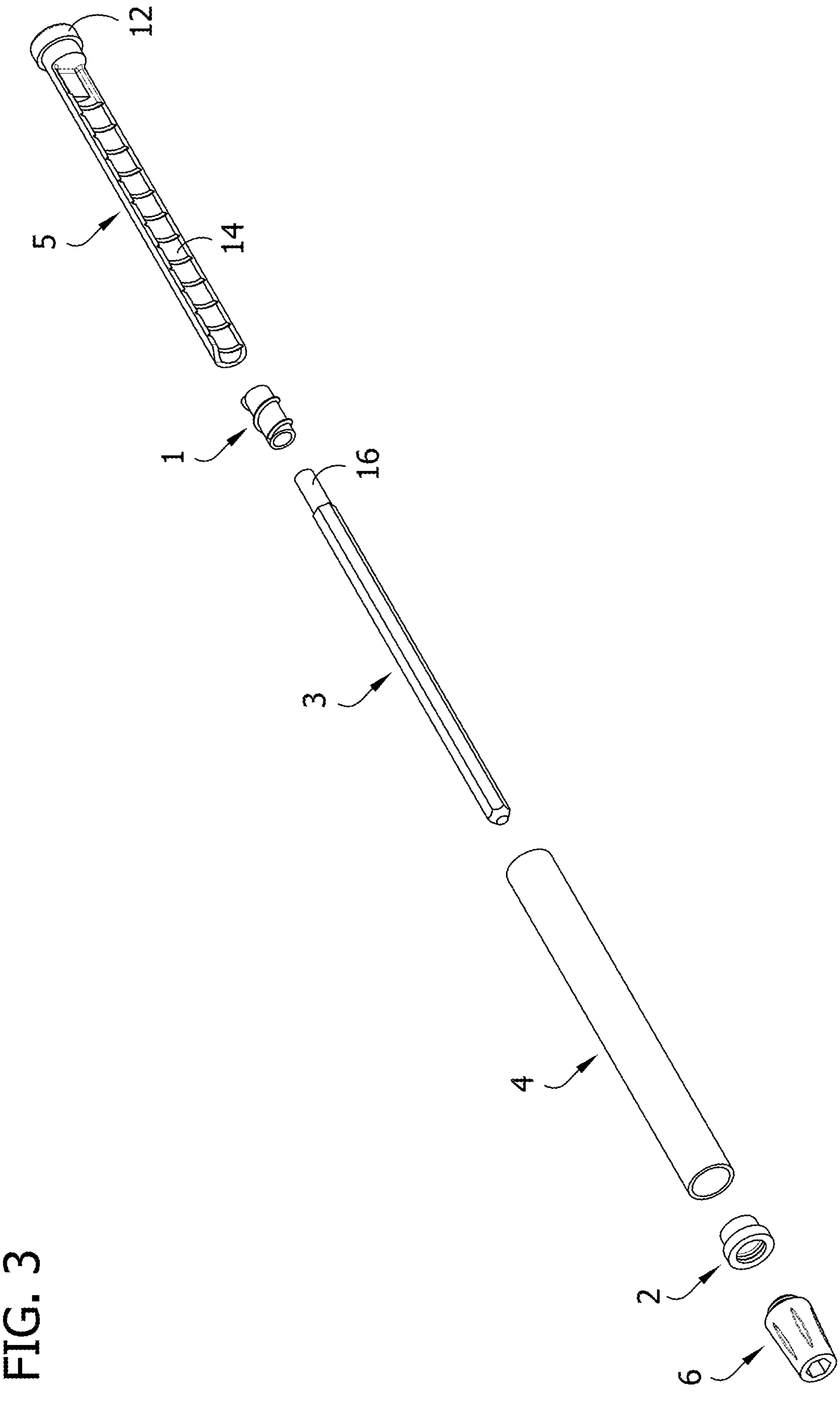
FIG. 3 is an exploded view of the apparatus of FIG. 1 showing the crayon core in the apparatus.
Figure 4:
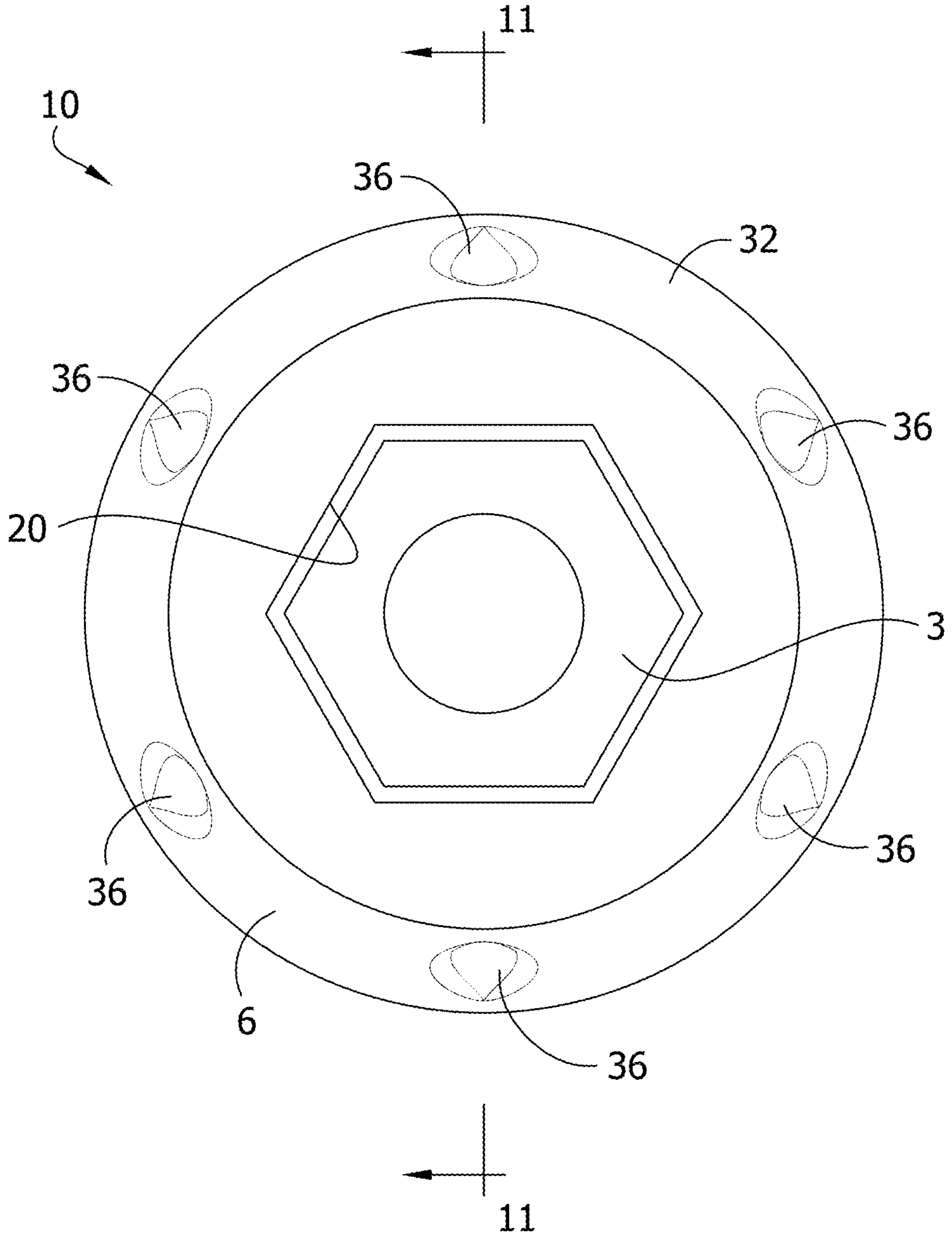
FIG. 4 is a front view of the apparatus of FIG. 1.
Figure 10:
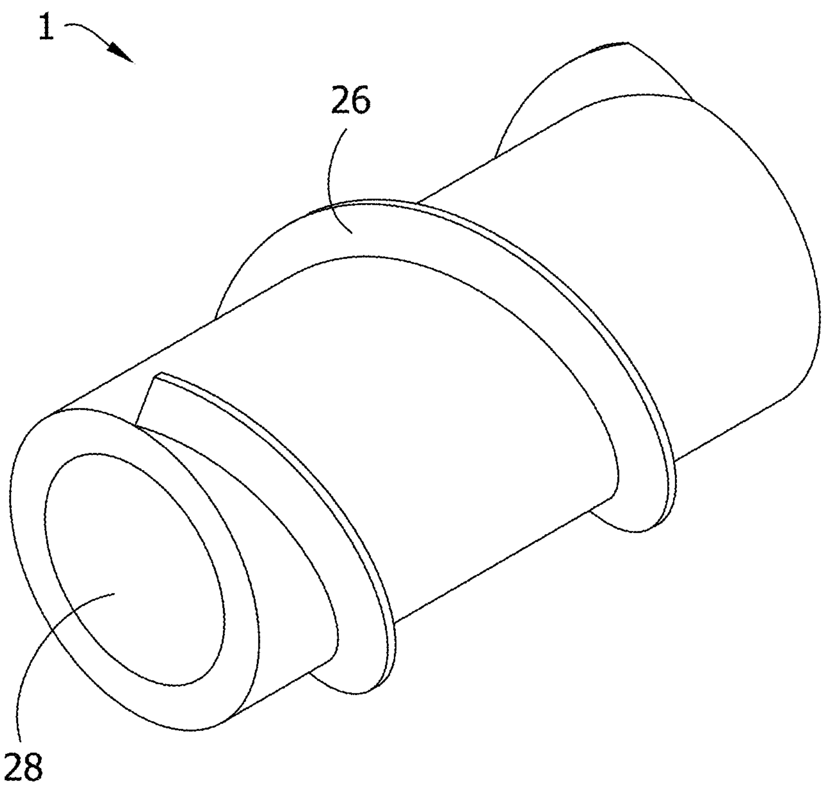
FIG. 10 is an enlarged perspective view of the follower component of the apparatus of FIG. 1.

As shown in FIG. 10, the follower 1 is a relatively short tubular structure with a spiral or helical ridge 26 protruding from its exterior. Follower 1 is configured to be cradled within the guide portion 14 of the trough 5 while remaining centered along the longitudinal axis of the apparatus 10. As is already known in the art, it will be appreciated that the span of the helical ridge must exceed the distance between successive grooves in the trough 5 to ensure that the follower 1 remains in proper engagement with the trough 5. In addition to the ridge 26, the follower 1 has a central opening 28 that is configured to securely receive the non-writing end 16 of the core 3 such that the core does not move relative to the follower. As is generally shown in FIGS. 2-3, it will be appreciated that the follower 1 and the collet 6 will together center the core 3 on the longitudinal axis when the core 3 is received by the follower 1 and collet 6 within the apparatus 10. In the present embodiment, it is contemplated that the follower 1 is made from polyethylene or a similar low-friction polymer.

Figure 6:
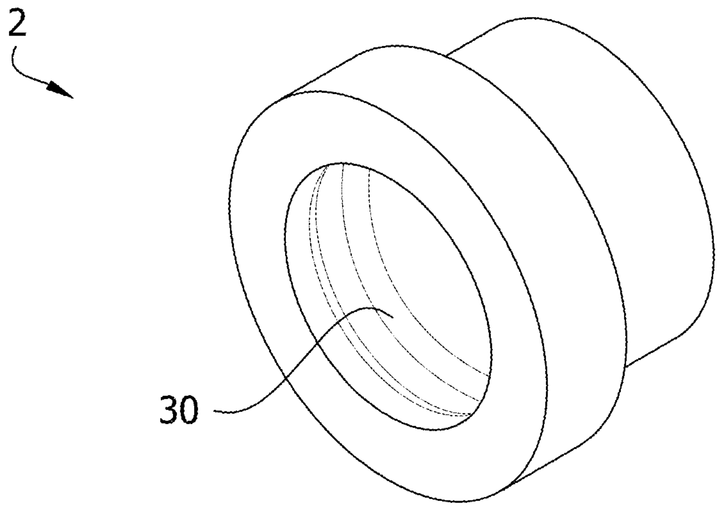
FIG. 6 is an enlarged perspective view of the spacer component of the apparatus of FIG. 1.

Referring now to FIG. 6, the spacer 2 is tubular and has a similar shape and function as the end portion of the trough 5 except that the spacer has a central opening 30 as opposed to being closed. The neck of spacer 2 is configured to be received by the opposite end of the paper barrel 4 such that the outermost sidewalls of the spacer are flush with paper barrel 4. Spacer 2 has a central opening 30 for receiving the collet 6 and the core 3. Opening 30 is configured to accommodate a snap-fit connection with the collet 6 such that the collet can rotate within the opening 30. In the present embodiment, it is contemplated that the spacer 2 is made of a semi-rigid to rigid, low-friction polymer.

Figure 7:
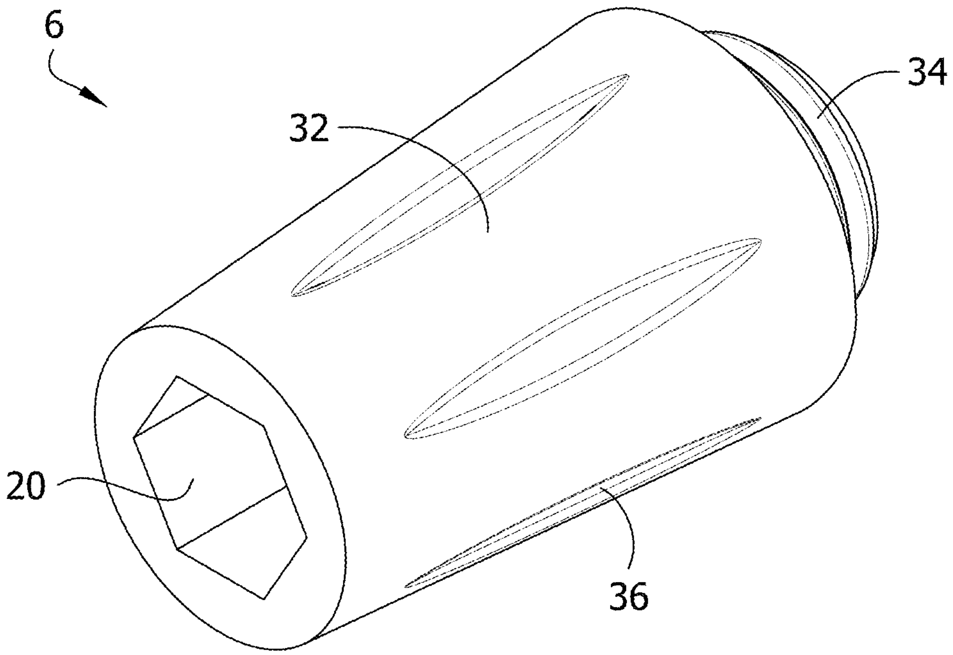
FIG. 7 is an enlarged perspective view of the collet component of the apparatus of FIG. 1.

Referring now to FIG. 7, the collet 6 has a frustoconical body 32, a snap fit flange 34 for engagement with the spacer 2, and a hexagonal passage 20 for receiving and driving the core 3. It will be appreciated that the collet 6 body tapers inward from its flanged end to its free end. As described above, passage 20 in the present embodiment is hexagonal, though it is contemplated that other non-circular cross-sectional geometries could also be used to accomplish the driving function. As shown in FIGS. 2 and 7, the collet 6 includes several gripping elements 36 disposed around the body 32. The gripping elements may be indentations, bumps, or other raised, depressed or textured features and are configured to improve the user's grip, particularly when the user is rotating the collet 6 to drive the core 3 forward or backward along the longitudinal axis of the apparatus 10.

Figure 5:
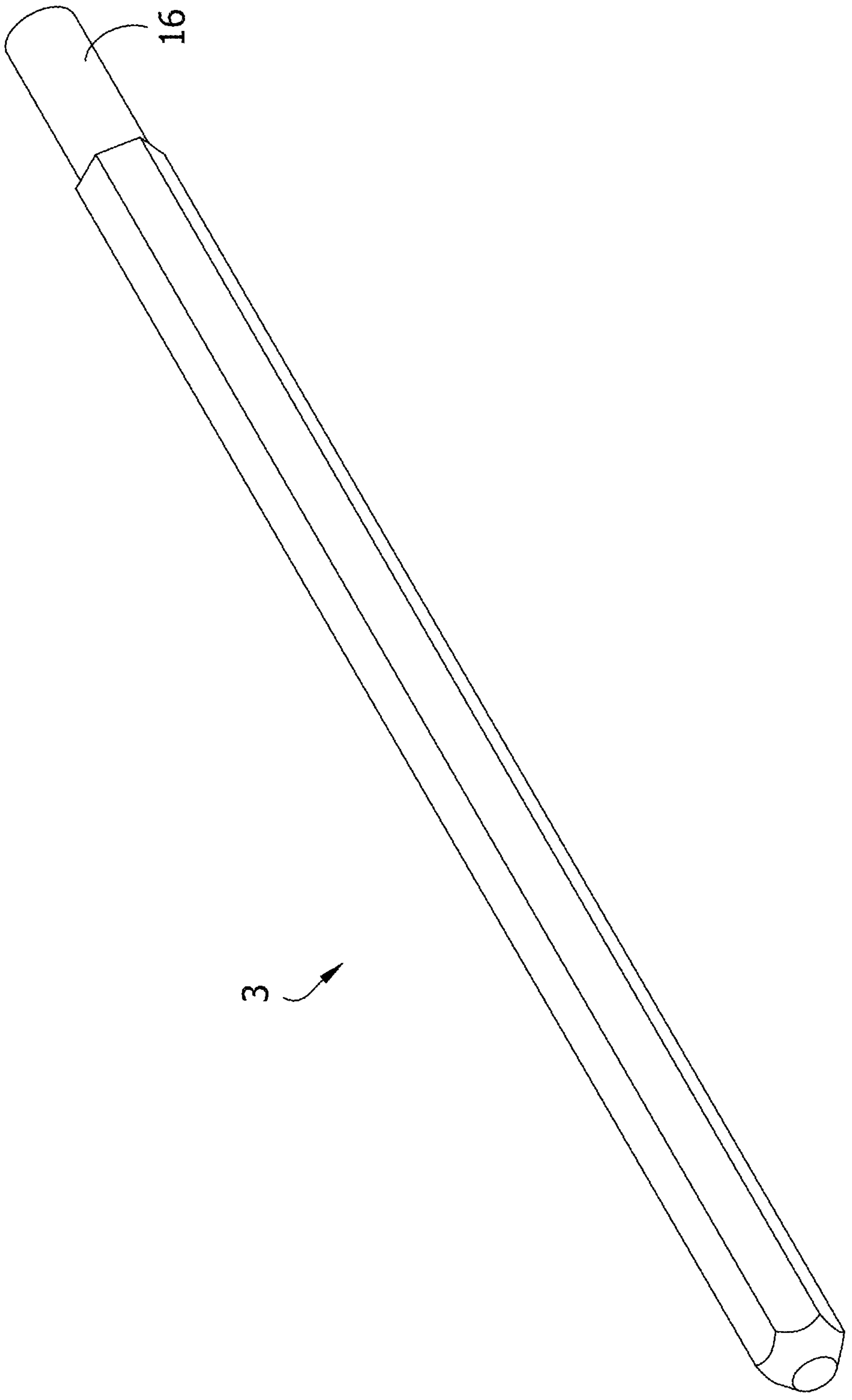
FIG. 5 is an enlarged perspective view of the crayon core shown in FIG. 1.

Looking at FIG. 5, the core 3 in the present embodiment is principally an elongate, hexagonally extruded body. Of course, in alternative embodiments, the geometry of the core 3 should correspond with the geometry of the passageway 20 of the collet 6 to ensure a proper driving engagement between the components. On the non-writing end 16, the core 3 has a circular cross-section, which allows for the core 3 to be securely received by the follower 1, such as by a press fit. In the present embodiment, the non-writing end 16 having a circular cross-section is approximately 0.4" long such that it extends a distance into the follower. On the opposite (writing) end of the core 3, the body of the core 3 may optionally be slightly sharpened to facilitate writing or drawing. While the core 3 of the present embodiment is a crayon, it will be understood that other retractable stick compounds may be used as a writing medium within the scope of this invention. As non-limiting examples, such compounds could include wax or oil based pencil cores, chalk, or pastels.

It is contemplated that the apparatus 10 may be disassembled (e.g., after the core 3 is expended) by separating the paper barrel 4 from the trough 5 and spacer 2. After the apparatus is disassembled, the user may recycle the plastic materials or may replace the core 3 or the paper barrel 4 (or both) and reassemble the apparatus in the above configuration. Thus, while it is understood that the trough 5 may be immovably secured to the inner surface of the paper barrel 4 for general use, the trough and spacer may be separated from the paper barrel for disassembly.

Figure 13:
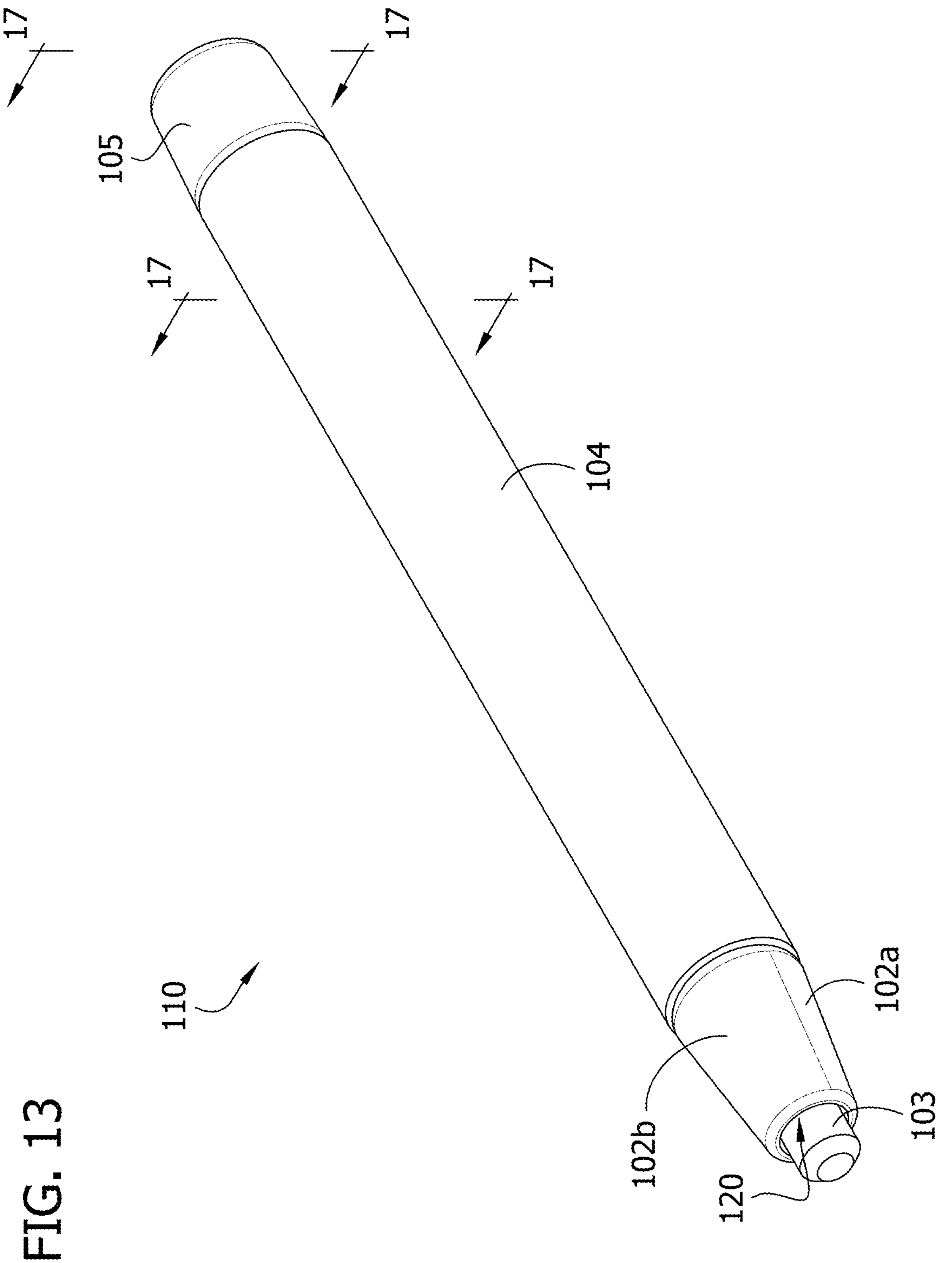
FIG. 13 is a perspective view of an apparatus in accordance with a second exemplary embodiment of the present invention showing a crayon core adjustably retained within the apparatus.
Figure 14:
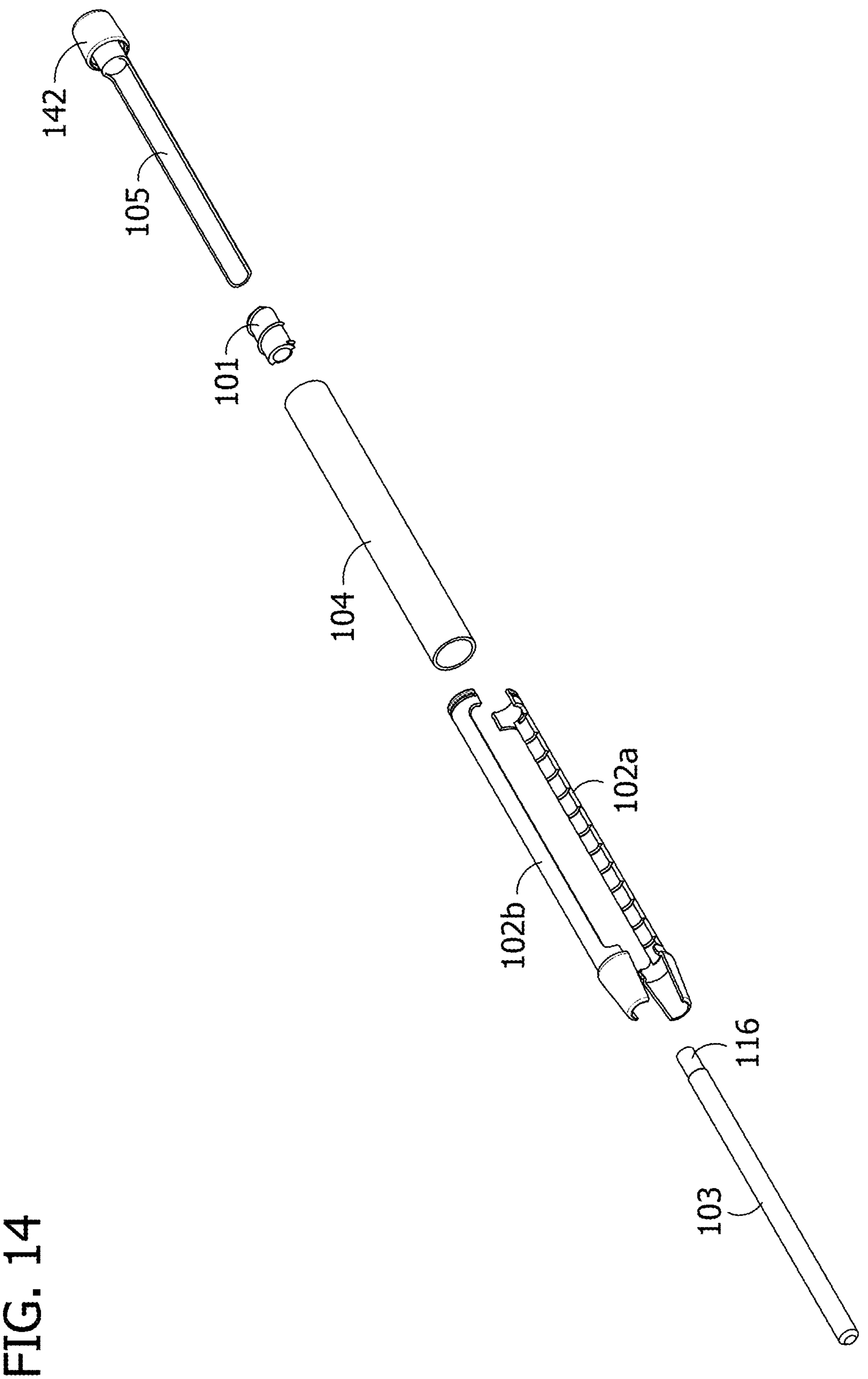
FIG. 14 is an exploded view of the apparatus of FIG. 13 showing the crayon core in the apparatus.
Figure 15:
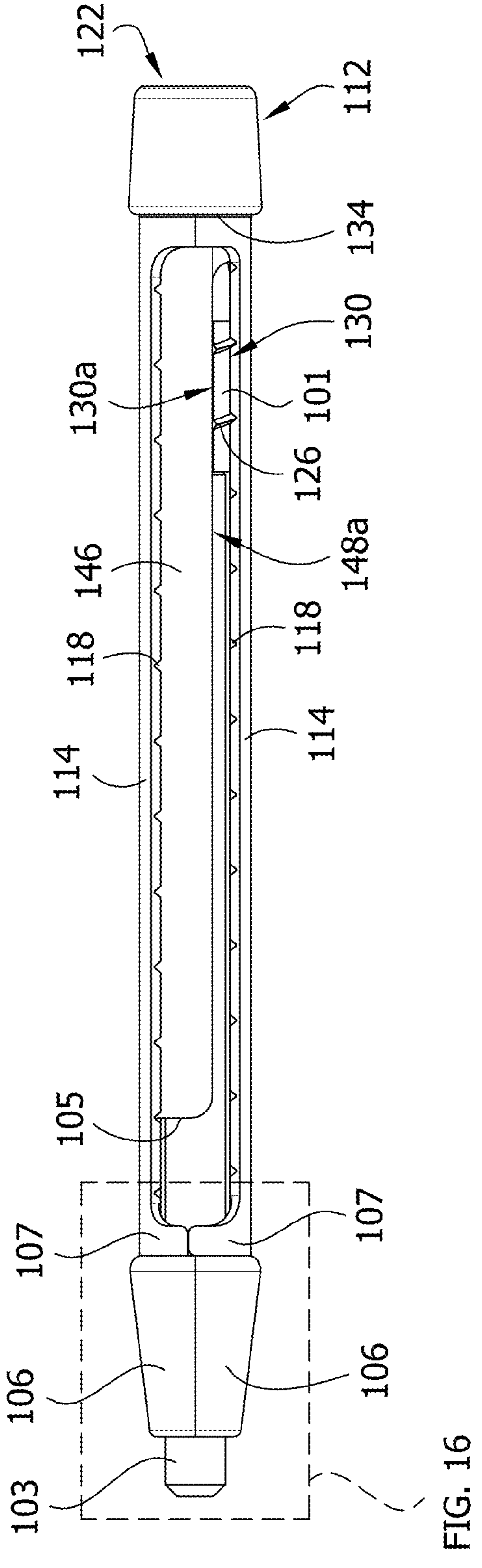
FIG. 15 is a side elevational view of the apparatus of FIG. 13 showing the crayon core in the apparatus with the paper barrel removed.

An apparatus for adjustably retaining an expendable writing and/or drawing medium or core (such as a crayon core) in accordance with a second exemplary embodiment of the present invention described and claimed herein is denoted generally in FIGS. 13-15 by numeral 110. As shown in FIG. 13, apparatus 110 can receive a writing medium or core such as the depicted crayon core 103 and is adjustable such that a user can drive the core 103 either forward or backward along the longitudinal axis of apparatus 110. As will be described herein below in connection with FIG. 15, the closed end 112 of cradle 105 is configured to be rotated by the user to facilitate the driving action to adjust the position of the core 103.

Referring now to FIGS. 13-15, apparatus 110 includes a paper barrel 104, two body members 102*a* and 102*b*, a cradle 105, and a follower 101. An expendable core for writing and/or drawing such as a crayon core 103 is received by the apparatus 110. The exterior of apparatus 110 is elongate and generally cylindrical, the exterior being defined by head portions 106 of respective body members 102*a* and 102*b*, the tubular shaped paper barrel 104 and a closed end 112 of the cradle 105. The paper barrel 104 is configured to fit over the bridge portions 114 of body members 102*a* and 102*b* to define a substantially continuous and generally rigid exterior surface of the apparatus 110 when apparatus 110 is fully assembled. It is contemplated that the paper barrel 104 fits tightly (and generally immovably) around outer surfaces of the body members 102*a* and 102*b* without being directly adhered or affixed thereto, reducing the materials required for manufacture and assembly. This also simplifies the manufacture and assembly process and enables easier disassembly for replacement of component parts for re-use and/or for recycling. Of course, the paper barrel 104 may alternatively be glued or otherwise affixed to one or both of the body members 102*a*, 102*b*.

Figure 16:
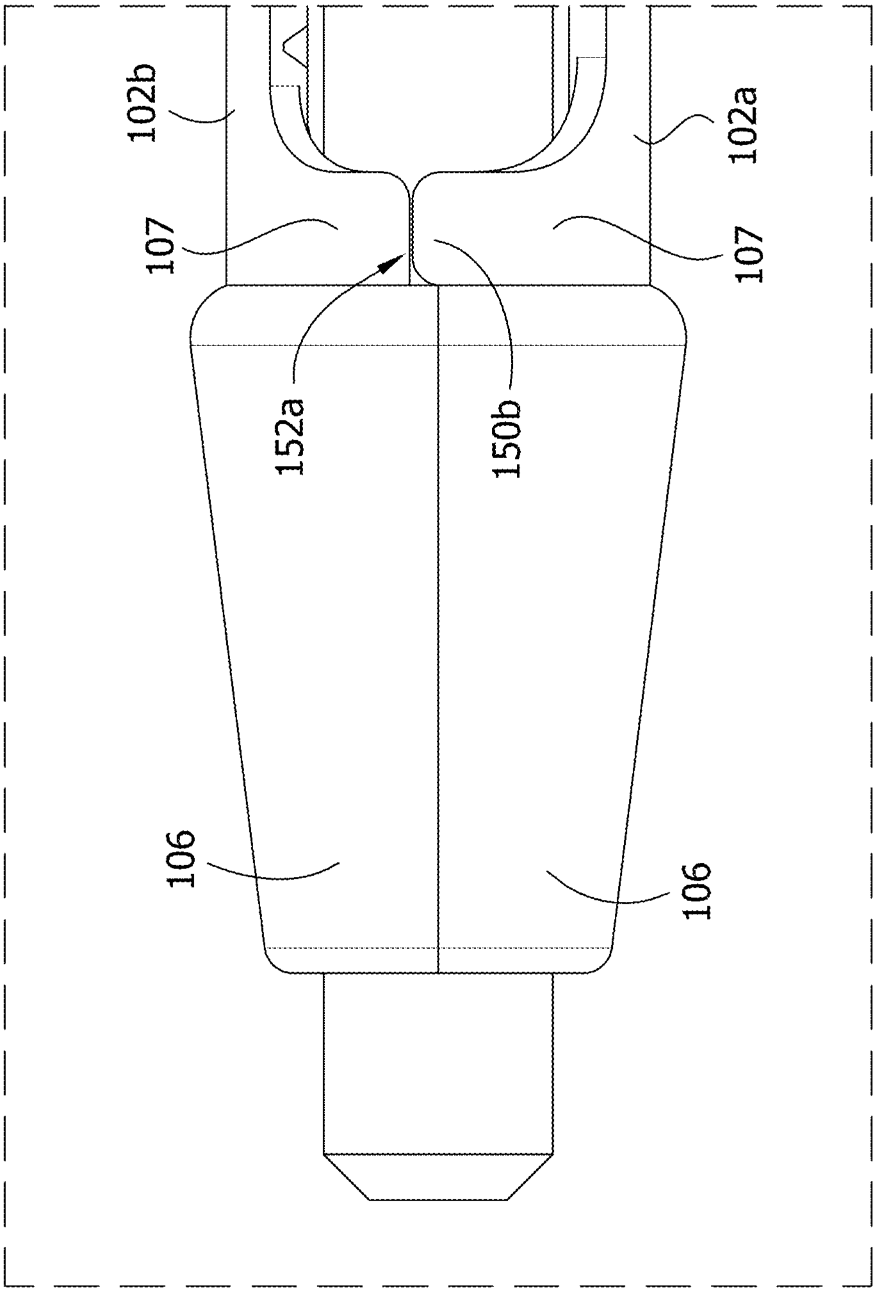
FIG. 16 is a magnified cut-out of FIG. 15 showing the interlocking placement feature of the body members.

Referring to FIGS. 15-19, the body members 102*a* and 102*b* are configured to remain stationary relative to one another, and the cradle 105 is configured to be secured to the connection portions 134 of respective body members 102*a*, 102*b* in a manner that allows the cradle 105 to rotate clockwise and counterclockwise relative to the central axis of apparatus 110. As will be explained in greater detail herein, the rotation of cradle 105 (in conjunction with follower 101) is essential to the driving mechanism of the apparatus 101. When thus engaged, the cradle 105 secures the body members 102*a*, 102*b* together generally at the non-writing end of apparatus 110. As will further be explained herein, an interlocking placement feature, defined by placement wings 150 in body member 102*a* and placement notches 152 in body member 102*b*, align the respective body members generally at the writing end of the apparatus 110, as is generally shown in FIG. 16. The barrel 104 securely and tightly envelops the body members 102*a* and 102*b* between the writing and non-writing ends, providing further body stability, as is best seen in FIGS. 13-14.

The exterior of apparatus 101 is shaped and sized to be held and handled like a traditional writing and/or drawing utensil. It will be appreciated that the head portions 106 taper slightly inward toward a writing end of the apparatus 110 to define a generally conical surface, improving handling and gripping near the exposed portion of the core 103 that protrudes outward from the body. On the opposite end of the body, the end of the paper barrel 104 abuts and is flush with the sheath 142 of the closed end 112 of cradle 105 to reduce the risk of accidental or deliberate disassembly of the apparatus 110 and/or interference with the driving mechanism housed within the body.

Figure 17:
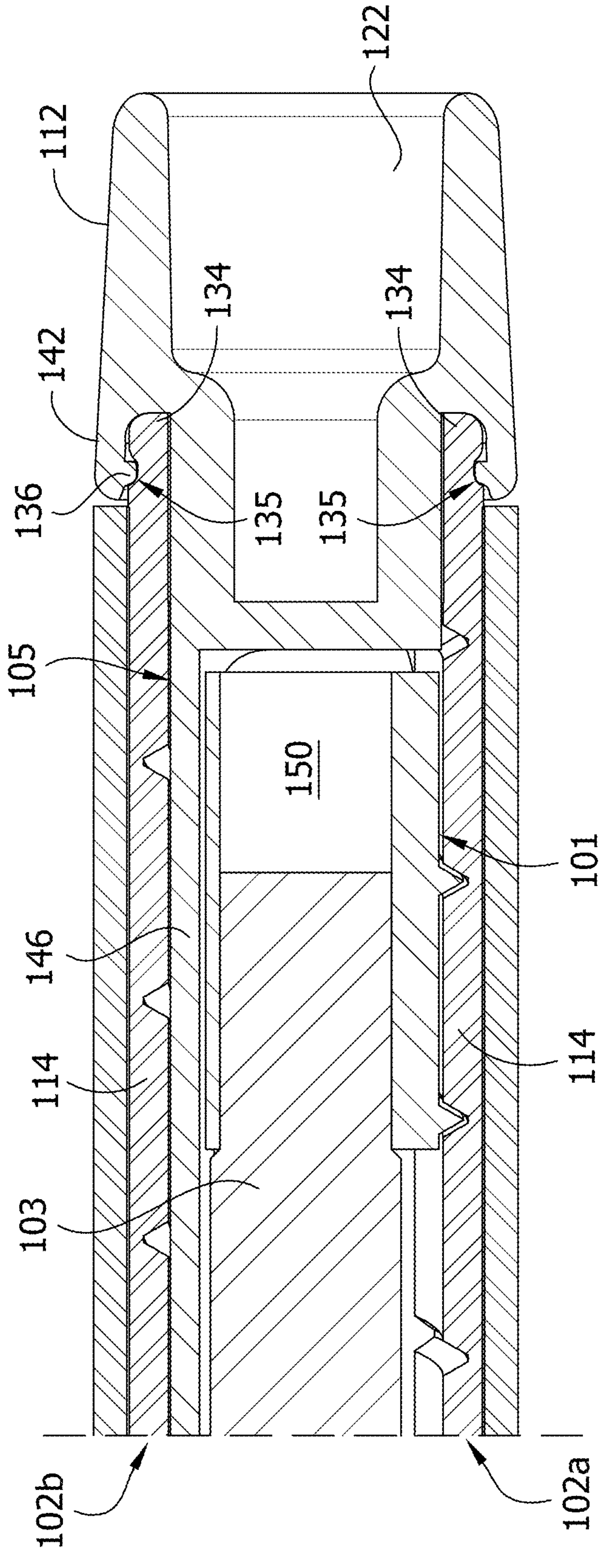
FIG. 17 is an enlarged fragmentary cross-section of a rear end of the apparatus of FIG. 13 taken between lines 17-17 of FIG. 13.

Referring now to FIGS. 14-15 and 17, the driving mechanism of the apparatus is defined by respective bridge portions 114 of the body members 102*a* and 102*b*, the cradle 105, and the follower 101. The follower 101 is configured to securely receive a non-writing end 116 of the core 103 and to follow a spiral path defined by grooves 118 in the bridge portions 114, as will be described in greater detail below. Additionally, as will be described in greater detail below, the follower 101 is configured to rotate in conjunction with the cradle 105 about the longitudinal axis while also sliding along the longitudinal axis over the travel portion 146 of cradle 105 as the follower 101 follows the spiral path. Due to the constraints in the movement of the follower 101, to which the core 103 is attached, the core 103 may only advance forward or backward along the longitudinal axis when the cradle 105 is rotated clockwise or counterclockwise relative to the longitudinal axis. It will be appreciated, then, that the closed end 112 of the cradle 105 is configured to drive the rotation of the follower 101 and, by extension, the advancement of the core 103. In the present embodiment, when the apparatus 110 is assembled, the head portions 106 of body members 102*a*, 102*b* define a generally round core passage 120 that envelops the core 103 to provide stability to the core at the writing end, as is best seen in FIG. 13. It will be appreciated that the inner surface of core passage 120 should have a low frictional coefficient to facilitate movement of the core 103 therethrough.

Figure 18:
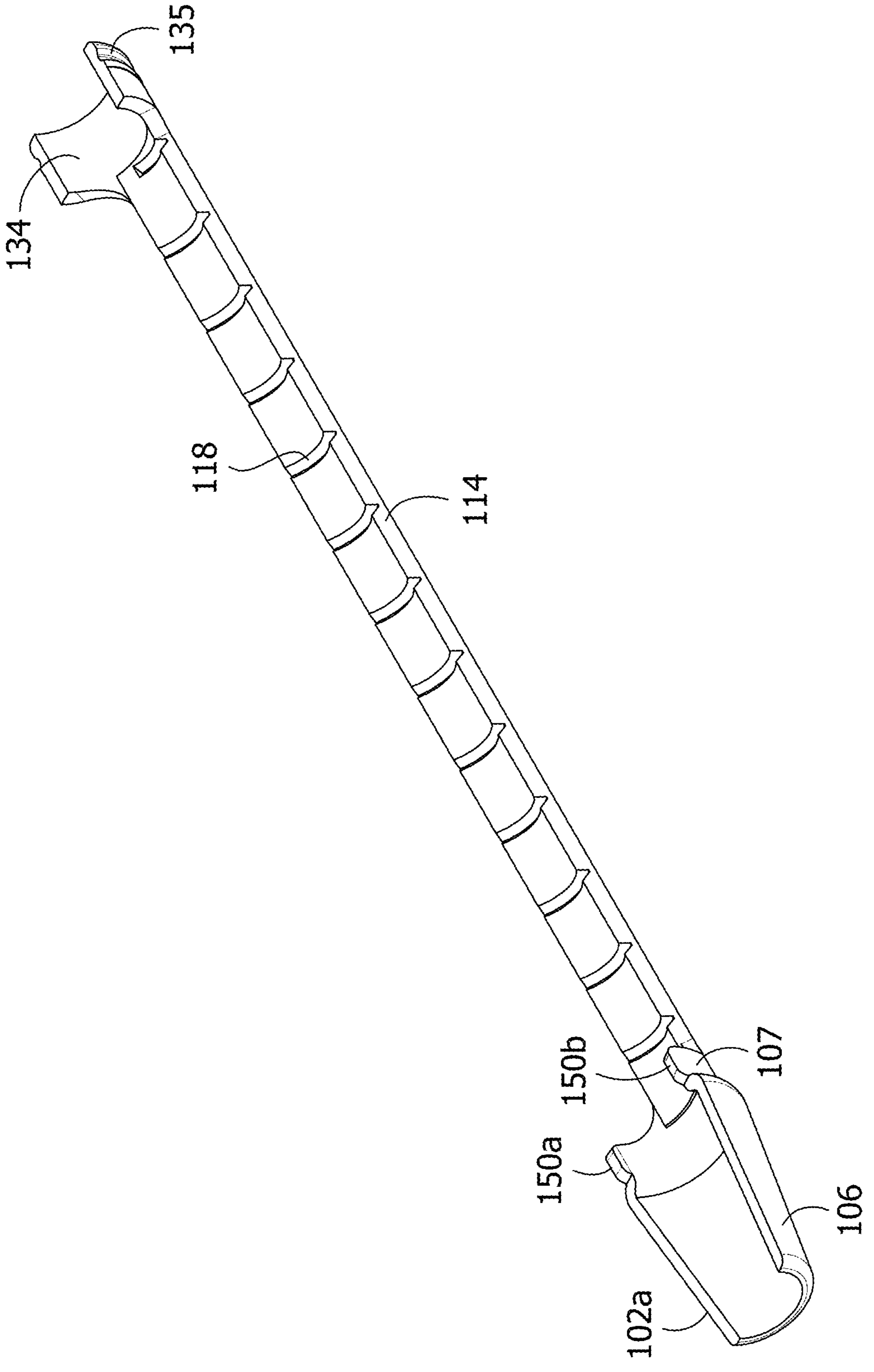
FIG. 18 is an enlarged perspective view of a first body member of the apparatus of FIG. 13.
Figure 19:
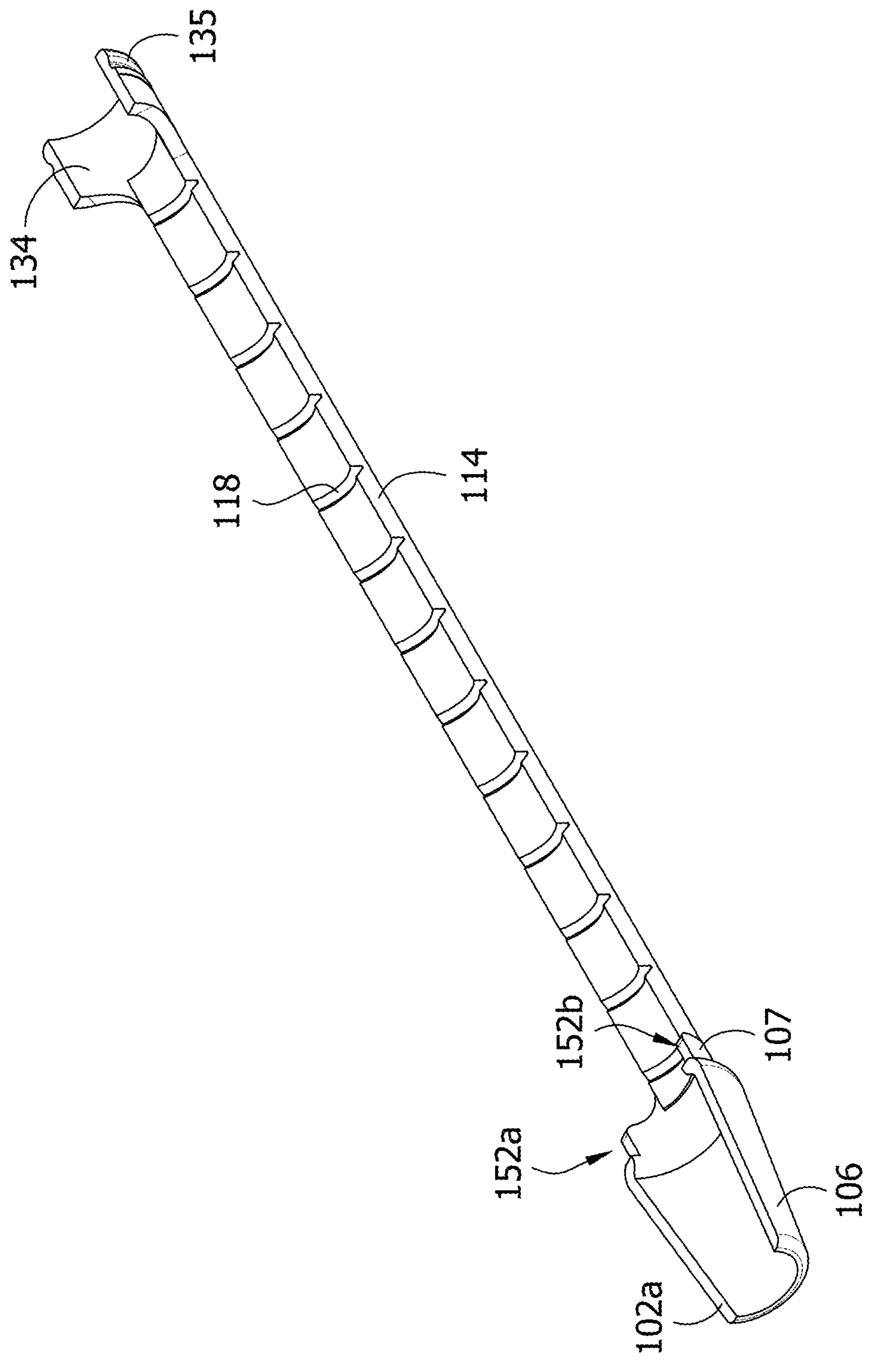
FIG. 19 is an enlarged perspective view of a second body member of the apparatus of FIG. 13.

In the present embodiment, each body member 102*a*, 102*b* includes a respective connection portion 134 at the non-writing end opposite head portion 106, as is best seen in FIGS. 18-19. Each connection portion 134 has a respective receiving groove 135 near the non-writing end. When apparatus 110 is assembled, the receiving grooves 135 align and define an annular channel, which receives snap flange 136 (shown in FIGS. 17 and 20). In this manner, the cradle 105 and body members 102*a*, 102*b* (collectively, the "snap fit elements") are joined in interlocking engagement. When the snap flange 136 is thus engaged, body members 102*a* and 102*b* are immovably secured relative to one another, and cradle 105 is restricted from moving translationally but is able to rotate about the longitudinal axis of apparatus 110. The interlocking engagement of cradle 105 and body members 102*a*, 102*b* eliminates the need for an adhesive or an additional fastening element to join the elements together. In the present embodiment, it is contemplated that a user cannot easily overcome the interference between the snap fit elements to dismantle the apparatus 110, as by accident. Thus, the body members 102*a*, 102*b* are immovable relative to the paper barrel 104 in use, while the cradle 105 is free to rotate relative to the body members and barrel. In some embodiments, a user may be able to unfasten and subsequently re-fasten the snap fit elements one or more times, for example, to replace the core 103 or another element that is inaccessible when apparatus 110 is fully assembled. It is contemplated that the body members 102*a*, 102*b* and cradle 105 can be otherwise secured together without departing from the scope of the invention, with a different snap fit configuration or a different fastening means.

Figure 20:
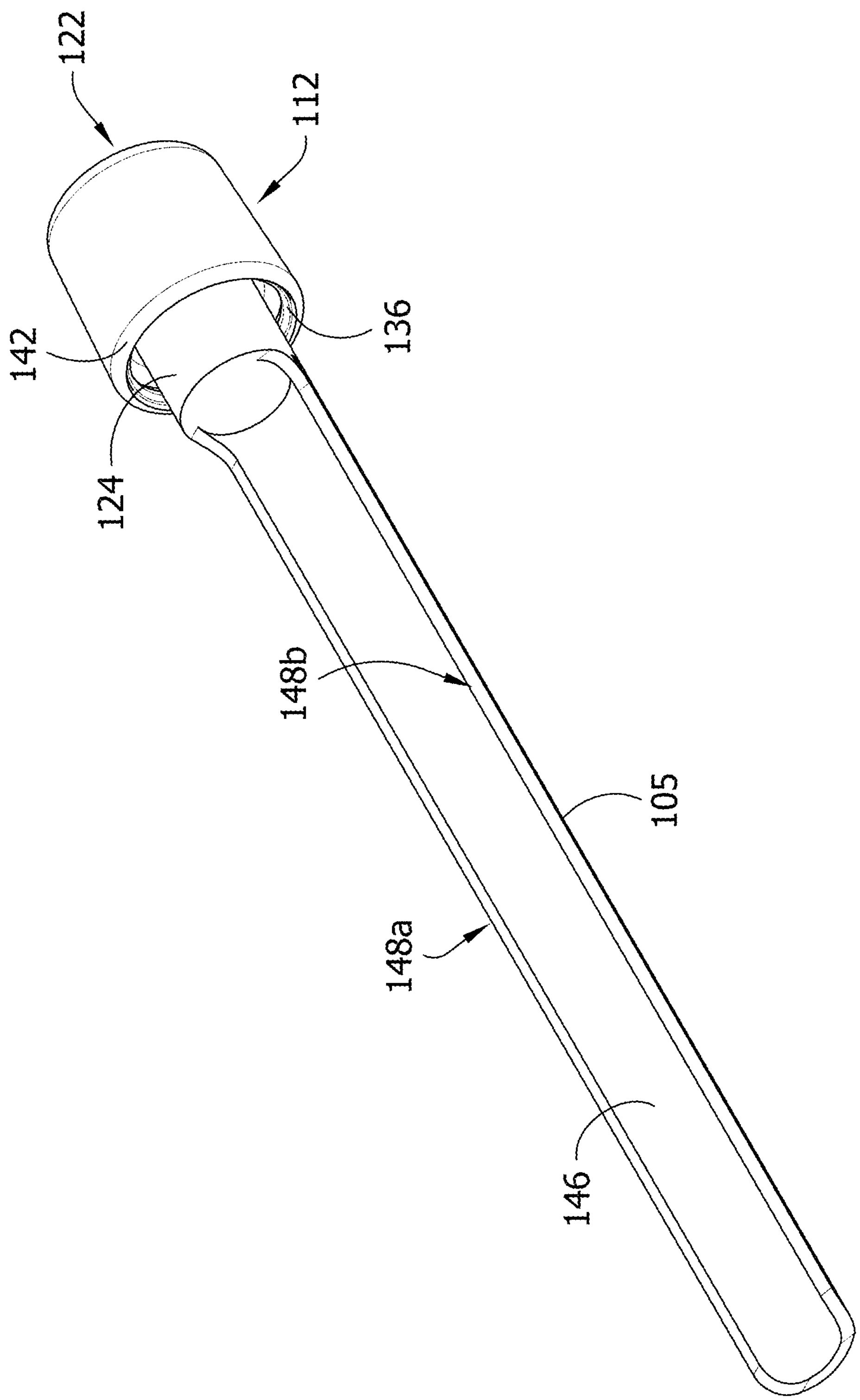
FIG. 20 is an enlarged perspective view of the cradle component of the apparatus of FIG. 13.

As shown in FIG. 20, the cradle 105 is defined by a closed end 112 and an elongated travel portion 146 extending forward of closed end 112. Closed end 112 has a generally tubular cap 122, a sheath 142 which extends forward of the cap 122, and a cylindrical internal neck 124 which extends forward of the cap 122 radially inward of the sheath 142 and which further includes snap flange 136 as previously described. The sheath 142 is configured to envelop a distal portion of the body members 102*a*, 102*b* and abut the non-writing end of the paper barrel 104 such that the sheath 142 is flush with the barrel 104 when the apparatus 110 is fully assembled. It will be appreciated that the sheath 142 thus secures the barrel 104 on the non-writing side. The travel portion 146 of cradle 105 has a hollowed, arcuate profile. As can generally be seen in FIG. 13, the travel portion 146 is configured to fit between the bridge portions 114 and connection portions 134 of body members 102*a*, 102*b* on its external side, and between the core 103 and tubular portion 150 of follower 101 on its internal side. The travel portion 146 is further configured to abut the contact edges 130*a*, 130*b* the follower 101 on both of its edges 148*a*, 148*b* (described in more detail below in connection with FIG. 20). This abutting configuration between follower 101 and travel portion 146 constrains the motion of follower 101 so it rotates in conjunction with the cradle 105. In the present embodiment, it is contemplated that the cradle 105 is integrally formed and made of polystyrene or another semi-rigid to rigid, low-friction polymer.

In the present embodiment, the body members 102*a*, 102*b* are mostly identical and will be described in relation to body member 102*a* as depicted in FIG. 18. Differences in the features of body member 102*b* of the present embodiment, as shown in FIG. 19, will be described where applicable. Body member 102*a* is defined by a head portion 106, a placement collar portion 107 adjacent the head portion 106 on the non-writing side, a connection portion 134 and a narrower bridge portion 114 extending between the placement collar portion 107 and the connection portion 134. The head portion 106 and connection portion 134 have a hollowed, generally semicircular profile, and the bridge portion 114 has a hollowed shallow arcuate profile. As previously discussed, the hollowed profile of the head portion 106 is dimensioned to partially define the core passage 120 at the writing end of apparatus 110. The rounded profile of the connection portion 134 and bridge portion 114 is dimensioned to allow these portions of the body member 102*a* to fit between the paper barrel 104 on its external side and the travel portion 146 of the cradle 105 on its internal side. The cross-sectional profile of each bridge portion 114 is relatively shallow such that it does not form a full semicircle. In the embodiment shown, the cross-sectional profile of each bridge portion 114 has an arc length of approximately 75 degrees. In some embodiments, the cross-sectional profile of the bridge portion 114 is less than 180 degrees and is preferably less than 90 degrees. The bridge portions 114 are centered relative to the head portion 106 and connection portion 134 such that when the body members 102*a* and 102*b* are joined together, the bridge portions 114 are on opposite sides of the apparatus with elongated gaps therebetween. Using bridge portions having cross-sectional profiles less than a full semicircle reduces the amount of material (e.g., plastic) used to make the apparatus while still providing rigidity and support to the barrel.

As shown in FIG. 18, the placement collar portion 107 of body member 102*a* extends circumferentially beyond the generally semicircular profile of the head portion 106 to define two placement wings 150*a* and 150*b*. As shown in FIG. 19, the placement collar portion 107 of body member 102*b* extends circumferentially short of the semicircular profile of the head portion 106 to define two placement notches 152*a*, 152*b*. It will be appreciated that the depth of the placement notches 152*a*, 150*b* is generally equal to the depth of corresponding placement wings 150*a*, 150*b* so the body members 102*a*, 102*b* fit together closely when apparatus 110 is fully assembled. As will be described below in connection with FIG. 16, the interlocking engagement of the placement wings (150*b* shown) and corresponding placement notches (152*a* shown) when apparatus 110 is assembled improves the alignment of body members 102*a*, 102*b* and, in particular, grooves 118.

Referring again to FIG. 18, the interior wall of the bridge portion 114 includes a series of spaced apart threaded grooves 118. These grooves 118 are dimensioned to engage with the helical threads 126 of the follower 101. It will be appreciated that the pitch of the grooves 118 in each bridge portion 114 corresponds with the pitch of threads 126 in the follower 101, and this, in turn, allows the follower 101 to travel forward or backward on the spiral path defined by the grooves 118 of each bridge portion 114 when the follower 101 is rotated either counterclockwise or clockwise, respectively. Further, it will be appreciated that the position of the grooves 118 in the body member 102*b* are displaced relative to the grooves in the body member 102*a* to ensure a uniform spiral path is defined by the grooves 118 of body member 102*a* and body member 102*b*, respectively. In the present embodiment, the displacement distance is equal to one half the pitch of the threads 126 and grooves 118 because the respective bridge portions 114 are disposed on opposite sides of apparatus 110. In addition to its role in the driving mechanism, the bridge portion 114 of the body member 102*a* provides structural reinforcement to the body. The head portion 106 protrudes slightly outward where the head portion adjoins the bridge portion 114 so that the non-writing end of head portion 106 is flush with the paper barrel 104 when the apparatus 110 is assembled. The exterior surface of head portion 106 is smooth in the present embodiment, though in other embodiments the head portion may have a different shape, texture or pattern to improve aesthetics or functionality (e.g., enhancing user grip). In the present embodiment, it is contemplated that each of the body members 102*a*, 102*b* is integrally formed and made of polypropylene or another semi-rigid to rigid, low-friction polymer.

Referring now to FIGS. 16 and 18-19, apparatus 110 of the present embodiment includes an interlocking placement feature defined by the placement wings 150*a*, 150*b* in the placement collar portion 107 of body member 102*a* and the placement notches 152*a*, 152*b* in the placement collar portion 107 of body member 102*b*. The interlocking placement feature aligns body members 102*a*, 102*b* near the writing end of the apparatus 110 to ensure a generally uniform alignment of grooves 118 from the non-writing end (where cradle 105 and connector portions 134 are secured by snap fit) to the writing end, as well as a generally straight core passage 120 as described above in connection with FIG. 13. As shown in FIG. 16, when the body members 102*a*, 102*b* are joined, each wing 150 of body member 102*a* is received by a corresponding placement notch 152 of body member 102*b* to establish the interlocking engagement described herein. In alternative embodiments, the body members 102*a*, 102*b* (or other comparable body elements) may have additional and/or other features to improve stability and alignment near the head portions 106.

Figure 21:
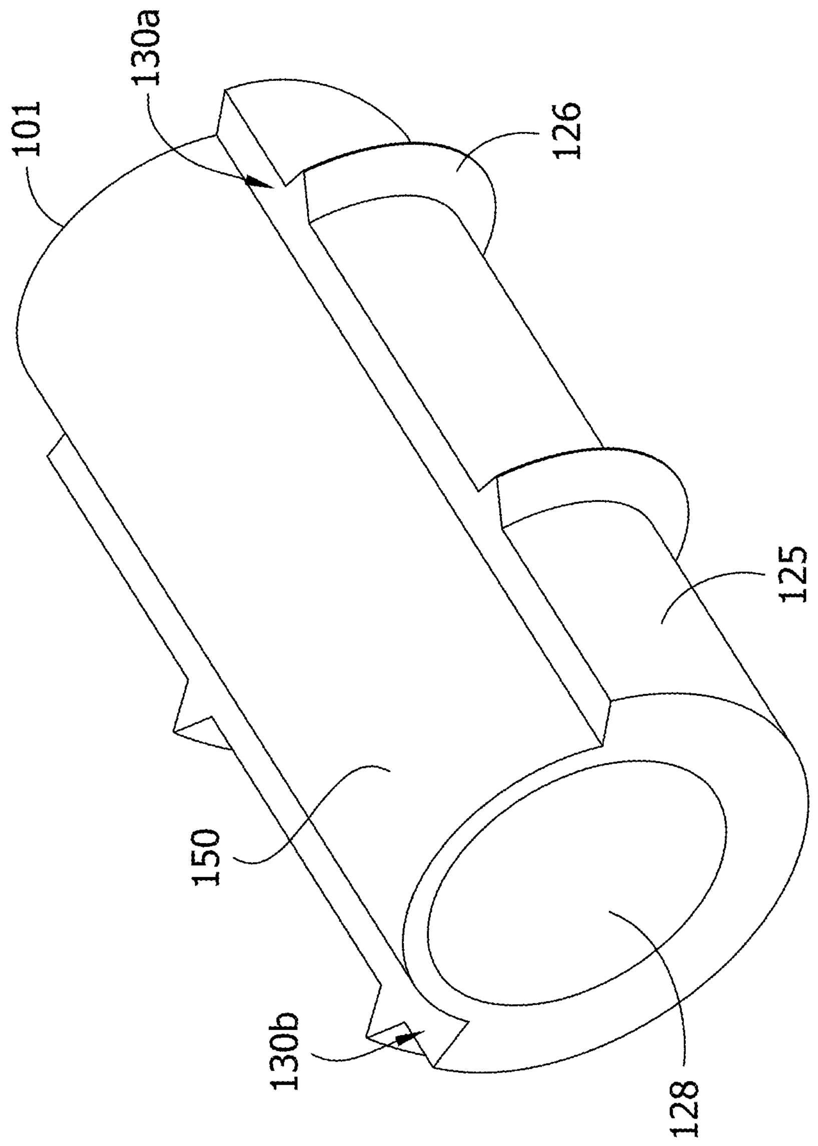
FIG. 21 is an enlarged perspective view of the follower component of the apparatus of FIG. 13.

As shown in FIG. 21, the follower 101 is a relatively short tubular structure with a raised portion 125 along a portion of the circumference of follower 101 that includes a series of helically aligned threads 126 protruding from the exterior thereof. This defines a tubular portion 150 and along the remaining, non-raised portion of the follower 101, and contact edges 130*a*, 130*b* at the radial boundaries of the raised portion 125. As best seen in FIG. 17, the tubular portion 150 of follower 101 is configured to be cradled within the travel portion 146 of the cradle 105 so the follower 101 remains centered on the longitudinal axis of the apparatus 110 when the apparatus is fully assembled. Referring also to FIGS. 15 and 20-21, the contact edges 130*a*, 130*b* of the follower 101 are configured to abut respective side edges 148*a*, 148*b* of travel portion 146 so the follower 101 rotates both clockwise and counterclockwise in conjunction with the cradle 105 while advancing or regressing along the longitudinal axis. The threads 126 are configured to fit in the grooves 118, allowing the follower 101 to advance or regress along the helical path defined thereby as the cradle 105 is rotated clockwise or counterclockwise. It will be appreciated that the span of the helical threads 126 must exceed the separation distance between successive grooves in the respective bridge portions 114 of body members 102*a*, 102*b* to ensure that the follower 101 remains aligned and engaged with the grooves 118. In the present embodiment, the threads 126 span approximately 210 degrees, and the bridge portions 114 are separated by approximately 105 degrees, though it is contemplated that other embodiments may have differing dimensions without departing from the scope of the invention.

Referring again to FIG. 21, the follower 101 has a central opening 128 that is configured to securely receive the non-writing end 116 of the core 103 such that the core does not move relative to the follower. As is generally shown in FIGS. 14-15, it will be appreciated that the follower 101 and the head portions 106 can together center the core 103 on the longitudinal axis when the core 103 is received by the follower 101 and body members 102*a*, 102*b* within the apparatus 110. In the present embodiment, it is contemplated that the follower 101 is made from polyethylene or a similar low-friction polymer.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An apparatus for adjustably retaining an expendable core for writing or drawing, said apparatus comprising:

a tubular barrel having an outer barrel surface and an inner barrel surface;

at least one elongated arcuate body element having an outer body surface and an inner body surface, the inner body surface comprising spaced surface features, wherein the body element is positioned along a portion of the inner barrel surface with the outer body surface positioned in abutting engagement with the inner barrel surface;

a follower positioned in abutting engagement with a portion of the inner body surface, the follower having a helical surface feature corresponding with the spaced surface features of the body such that the spaced surface features define a spiral path along the length of the body for the follower, the follower having an aperture configured to receive a non-writing end of an expendable core.

2. The apparatus of claim 1, wherein each of the at least one body element has a cross-sectional profile that is less than 180°.

3. The apparatus of claim 1, wherein the tubular barrel is made of a paper based material.

4. The apparatus of claim 1, wherein the barrel, the at least one body element and the follower are mechanically connected without the use of adhesives.

5. The apparatus of claim 1, wherein the helical surface feature of the follower comprises a plurality of discontinuous follower ridges.

6. The apparatus of claim 5, wherein each of the plurality of follower ridges is configured to span at least half the perimeter of the follower about a longitudinal axis.

7. An apparatus for adjustably retaining an expendable core for writing or drawing, said apparatus comprising:

a tubular barrel having an outer barrel surface and an inner barrel surface;

an elongated trough having an outer trough surface and an inner trough surface, the inner trough surface comprising spaced surface features, wherein the trough is immovably affixed along a portion of the inner barrel surface with the outer trough surface positioned in abutting engagement with the inner barrel surface;

a follower positioned within the trough in abutting engagement with a portion of the inner trough surface, the follower having a helical surface feature corresponding with the spaced surface features of the trough such that the spaced surface features define a spiral path along the length of the trough for the follower, the follower having an aperture configured to receive a non-writing end of an expendable core; and a collet configured to rotate relative to the tubular barrel, the collet comprising a non-circular shaped passageway corresponding in shape to the expendable core such that the core can freely slide through the passageway along a longitudinal axis of the passageway but not rotate relative to the collet, and such that a writing end of the core protrudes from the passageway.

8. The apparatus of claim 7, further comprising a spacer, the spacer comprising a first side and a second side, the first side being immovably affixed to an end of the tubular barrel, and the second side being movably affixed to the collet.

9. The apparatus of claim 7, wherein the tubular barrel comprises a paper based material.

10. The apparatus of claim 7, wherein the tubular barrel comprises paper board.

11. The apparatus of claim 7, wherein the outer trough surface is glued to the inner barrel surface.

12. The apparatus of claim 7, wherein the spaced surface features comprise spaced indentations.

13. The apparatus of claim 12, wherein the helical surface feature comprises a helical ridge.

14. The apparatus of claim 7, wherein the elongated trough comprises a closed end configured to cover an end of the barrel.

15. The apparatus of claim 7, wherein the non-circular shaped passageway has a polygonal shaped cross-section.

16. The apparatus of claim 7, wherein the non-circular shaped passageway is configured to receive a core having a polygonal shaped cross-section.

17. The apparatus of claim 7, wherein the apparatus is configured to receive a core comprising a crayon, a wax or oil based pencil, chalk or a pastel.

18. An apparatus for adjustably retaining an expendable core for writing or drawing, said apparatus comprising:

a tubular barrel having a writing end and a non-writing end;

a plurality of body members, each body member comprising:

a head portion;

a collar portion;

a guide portion having an inner guide surface, the inner guide surface comprising spaced surface features; and a connection portion;

an elongated cradle having an outer cradle surface, an inner cradle surface and cradle edges, wherein the outer cradle surface is configured to engage abuttingly with the inner guide surface of each of the plurality of body members;

a plug coupled to the elongated cradle, the plug being configured to engage the connection portion of each of the plurality of body members, said engagement securing the plug and the plurality of body members together while permitting the plug to rotate about a longitudinal axis of the apparatus relative to the plurality of body members; and a follower positioned within the cradle in abutting engagement with the inner cradle surface, the follower having a helical surface feature corresponding to the spaced surface features of the inner guide surface of the plurality of body members such that the spaced surface features define a spiral path for the follower along the length of the apparatus, the follower having an aperture configured to receive a non-writing end of an expendable core, and the follower further having two contact surfaces corresponding with the cradle edges such that the follower rotates with the cradle when a respective one of the contact surfaces abuts a corresponding one of the cradle edges and torque is applied.

19. The apparatus of claim 18, wherein the tubular barrel comprises paper board.

20. The apparatus of claim 18, wherein the plug and the cradle are integrally formed.

* * * * *